US010928272B2

(12) United States Patent
Meis et al.

(10) Patent No.: US 10,928,272 B2
(45) Date of Patent: Feb. 23, 2021

(54) ICE CRYSTAL ICING CONDITION SIMULATION METHOD AND SYSTEM

(71) Applicant: The Boeing Company, Chicago, IL (US)

(72) Inventors: Charles Steven Meis, Renton, WA (US); Erik M. Langhofer, Seattle, WA (US); David Charles Hass, Renton, WA (US); Rachel M. Darr, Renton, WA (US)

(73) Assignee: The Boeing Company, Chicago, IL (US)

( * ) Notice: Subject to any disclaimer, the term of this patent is extended or adjusted under 35 U.S.C. 154(b) by 256 days.

(21) Appl. No.: 16/215,366

(22) Filed: Dec. 10, 2018

(65) Prior Publication Data

US 2020/0182741 A1 Jun. 11, 2020

(51) Int. Cl.
*G01M 9/04* (2006.01)
*F25C 1/02* (2006.01)

(52) U.S. Cl.
CPC .............. *G01M 9/04* (2013.01); *F25C 1/02* (2013.01)

(58) Field of Classification Search
CPC .............. G01M 9/04; F25C 1/02; B64F 5/60
See application file for complete search history.

(56) References Cited

U.S. PATENT DOCUMENTS

| 5,088,280 A * | 2/1992 | Scott-Scott | ........... F28F 19/006 60/257 |
| 6,725,912 B1 * | 4/2004 | Moll | ....................... G01M 9/02 165/140 |
| 8,650,944 B2 * | 2/2014 | Meis | ....................... F25C 1/00 73/118.03 |

FOREIGN PATENT DOCUMENTS

| CN | 201041445 Y | 3/2008 |
| CN | 104634536 A | 5/2015 |
| CN | 102914416 B | 6/2015 |
| EP | 2650665 A2 | 10/2013 |
| GB | 2241537 A | 9/1991 |

OTHER PUBLICATIONS

European Patent Office Extended Search Report, dated Apr. 5, 2020, regarding Application No. EP19211593.9, 7 pages.
Mengyao et al., "Simulation of Air-Droplet Mixed Phase Flow in Icing Wind-Tunnel," AIP Conference Proceedings 1547, Published Jul. 19, 2013, 13 pages.

* cited by examiner

*Primary Examiner* — Freddie Kirkland, III
(74) *Attorney, Agent, or Firm* — Yee & Associates, P.C.

(57) ABSTRACT

A method and apparatus for simulating icing conditions using a wind tunnel is provided. Water drops are sprayed from a number of nozzles into the wind tunnel. A mist of cryogenic liquid is sprayed into a path of the water drops downwind of the nozzles in the wind tunnel, wherein the mist of cryogenic liquid turns the water drops into ice crystals.

20 Claims, 12 Drawing Sheets

ICE CRYSTAL ICING CONDITION SIMULATION METHOD AND SYSTEM

BACKGROUND INFORMATION

1. Field

The present disclosure relates generally to icing conditions and, in particular, to simulating icing conditions for an airplane.

2. Background

In aviation, icing on an aircraft may occur when the atmospheric conditions lead to the formation of ice on the surfaces of the aircraft. Further, this ice also may occur within the engine, on air data sensors such as Pitot probes, and total air temperature probes. Ice formation on the surfaces of the aircraft, on inlets of an engine, and other locations is undesirable and potentially unsafe for operating the aircraft.

Icing conditions may occur when drops of supercooled liquid water are present. In these illustrative examples, water is considered to be supercooled when the water is cooled below the stated freezing point for water but the water is still in a liquid form. Icing conditions may be characterized by the size of the drops, the liquid water content, the air temperature, and/or other parameters. These parameters may affect the rate and extent at which ice forms on an aircraft.

Therefore, it is desirable to have a method and apparatus that generates ice crystals continuously in the icing wind tunnel during tunnel test operations.

SUMMARY

In one illustrative embodiment, a method for simulating icing conditions using a wind tunnel is provided. Water drops are sprayed from a number of nozzles into the wind tunnel. A mist of cryogenic liquid is sprayed into a path of the water drops downwind of the nozzles in the wind tunnel, wherein the mist of cryogenic liquid turns the water drops into ice crystals.

In another illustrative embodiment, an icing simulation system is provided. The system comprises a wind tunnel and a number of nozzles configured to spray water drops into the wind tunnel. A heat exchanger chamber downwind from the nozzles is configured to spray a mist of cryogenic liquid into a path of the water drops, which turns the water drops into ice crystals.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
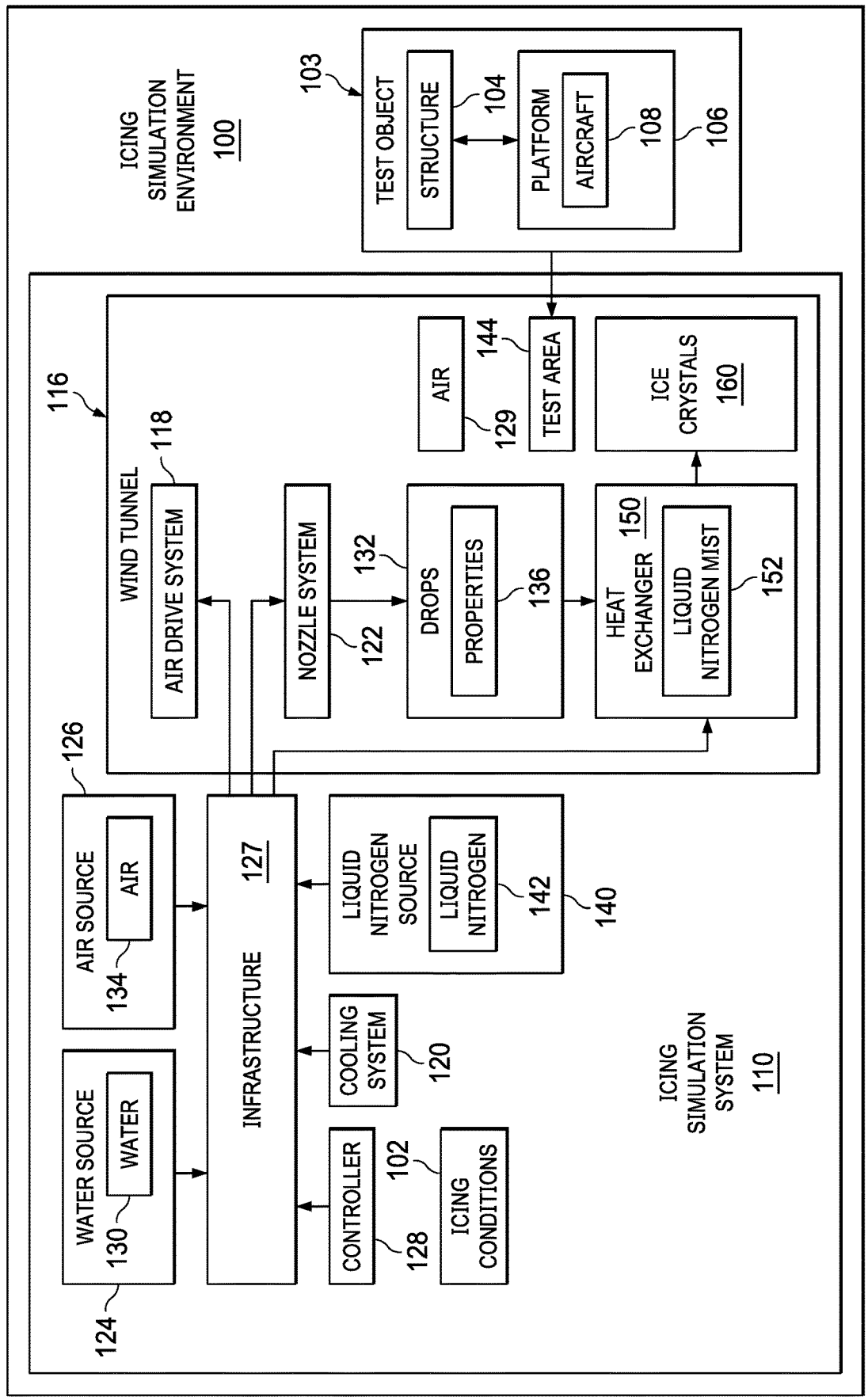
FIG. 1 is an illustration of a block diagram of an icing simulation environment in accordance with an illustrative embodiment.

The illustrative embodiments recognize and take into account one or more different considerations. For example, the illustrative embodiments recognize and take into account that currently available systems for simulating icing conditions are unable to simulate supercooled large drop icing conditions and generating ice crystals in real time during wind tunnel operations.

Drops of water may be supercooled in various environments. For example, drops of water may be supercooled in stratiform clouds and in cumulus clouds, typically at altitudes such as 22,000 feet or lower. These occur in stratiform clouds or cumulus clouds when the ambient temperature is below the freezing point for water but the water is still in a liquid form due to the lack of impurities or agitation/motion in the cloud.

Ice crystals may also be present in clouds. However, ice crystals occur at higher altitudes and colder temperatures. Ice crystal icing events frequently occur in convective weather systems in tropical or high-moisture environments (known as mesoscale convective systems) because convective updrafts bring near-surface moisture up to 40,000 feet or higher where the ambient temperatures may be −40° Fahrenheit/Celsius (° F./C.) or colder. These convective clouds may produce ice crystals, which can therefore be a threat to aircraft cruising at these altitudes because ice crystals remain frozen in the cloud until they impinge upon a warmer surface such as internal engine components or air data probe inlets like Pitot probes. Further, the median ice crystal mass dimension range is 50-250 microns (equivalent spherical size) based upon measurements near convective storm cores, where 1 micron is 1 millionth of a meter.

When icing forms on an aircraft, the aircraft may not operate as desired. For example, ice on the wing of an aircraft may cause the aircraft to stall at a lower angle of attack and have an increased drag.

Aircraft may have mechanisms to prevent icing, remove ice, or some combination thereof to handle these icing conditions. For example, aircraft may include icing detection, prevention, and removal systems. Ice may be removed using bleed air, infrared heating, and other suitable mechanisms.

Aircraft may have sensor systems designed to detect icing conditions. As new regulations are developed with respect to icing conditions that should be detected, manufacturers design and test sensor systems for detecting the icing conditions. For example, aircraft may be required to be certified to operate in normal icing conditions, in supercooled large drop icing conditions, and in ice crystal icing conditions. Analysis and testing, typically conducted in an icing wind tunnel, are required to demonstrate compliance with these certification requirements.

In order to simulate ice crystals for effective testing, the icing wind tunnel must be able to produce ice crystals directly or supercooled water droplets which are then converted into ice crystals in a uniform cloud with a measured liquid water content (LWC), ice water content (IWC) and median volumetric droplet diameter (MVD) within specified ranges.

Currently, however, the capability for icing tunnels to simulate ice crystals per the ice crystal environments defined in regulations is limited. There are very few tunnels that can do this and, while the methods used to make ice crystals are proprietary and not in the public domain, those methods may be limited to short time durations.

For example, the illustrative embodiments recognize and take into account that currently available wind tunnels used to simulate icing conditions may be limited to short time durations, perhaps because of a limited supply of ice crystals.

Thus, one or more illustrative embodiments provide a method and apparatus for simulating icing conditions. In one illustrative embodiment, an icing simulation system comprises a wind tunnel, a nozzle system, a heat exchanger chamber, and a controller. The nozzle system is configured to spray drops of water within the wind tunnel. The heat exchanger chamber is placed immediately downstream of the nozzles and releases liquid nitrogen mist into the path of the water drops, thereby turning them into ice crystals. The controller is configured to control a number of properties of the water in the nozzle system such that the nozzle system sprays the drops of water with sizes for a desired type of icing condition and simultaneously activates the nozzle system and heat exchanger.

With reference now to the figures and, in particular, with reference to FIG. 1, an illustration of a block diagram of an icing simulation environment 100 is depicted in accordance with an illustrative embodiment.

In particular, types of icing conditions 102 may be simulated for test object 103. Test object 103 may be, for example, structure 104, platform 106, or both. Structure 104 may be a structure in platform 106. When platform 106 takes the form of aircraft 108, structure 104 may be a structure in aircraft 108. For example, structure 104 may be a wing, a horizontal stabilizer, a vertical stabilizer, an engine, a landing gear system, a fuselage, a flap, an aircraft windshield, or some other suitable structure.

In the depicted examples, icing simulation system 110 is a physical system that also may include software. Icing simulation system 110 includes wind tunnel 116, air drive system 118, cooling system 120, nozzle system 122, water source 124, air source 126, infrastructure 127, controller 128, liquid nitrogen source 140, and other suitable components.

As depicted, air drive system 118 causes air 129 to flow within wind tunnel 116.

Infrastructure 127 comprises components that carry water 130 and air 134 to nozzle system 122. In particular, infrastructure 127 connects water source 124 and air source 126 to nozzle system 122. Additionally, infrastructure 127 also can be connected to cooling system 120. The connection to cooling system 120 can be used to cool water 130, air 134, or both.

Nozzle system 122 receives water 130 from water source 124 through infrastructure 127 and generates water drops 132. In other words, water drops 132 are generated by water 130 flowing through nozzle system 122.

In some illustrative examples, air 134 received through infrastructure 127 can be introduced into water 130 as the water flows through nozzle system 122 to form drops 132. In these illustrative examples, air source 126 also can send air 134 to nozzle system 122 via infrastructure 127. Within nozzle system 122, air 134 is mixed with water 130 to form water drops 132 sprayed by nozzle system 122.

Water drops 132 generated by nozzle system 122 may have properties 136. In an illustrative embodiment, water drops 132 have the property 136 of being supercooled when they leave the nozzle system 122 due to cooling system 120.

In an illustrative embodiment, infrastructure 127 also comprises components that carry liquid nitrogen 142 to heat exchanger 150 in the wind tunnel 116. In particular, infrastructure 127 connects liquid nitrogen source 140 to heat exchanger 150. The heat exchanger 150 generates a liquid nitrogen mist 152 into the downwind path of water drops 132, thereby forming ice crystals 160.

Controller 128 is configured to simultaneously turn on nozzle system 122 and introduce liquid nitrogen 142 into heat exchanger 150.

In these illustrative examples, controller 128 is comprised of hardware, software, or both. For example, controller 128 may be a computer system. The computer system may include one or more computers. When more than one computer is present in the computer system, those computers may be in communication with each other through a network. In other illustrative examples, controller 128 may be implemented using hardware with circuits configured to perform operations to simulate types of icing conditions 102.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

As depicted, test object 103 may be placed in test area 144 in wind tunnel 116 for exposure to ice crystals 160. This simulation of icing conditions 102 can be used to determine how test object 103 might function. For example, test object 103 may be an airfoil with sensors configured to detect icing conditions. By simulating icing conditions 102, a determination may be made as to whether the sensors are able to detect the icing conditions 102.

Figure 2:
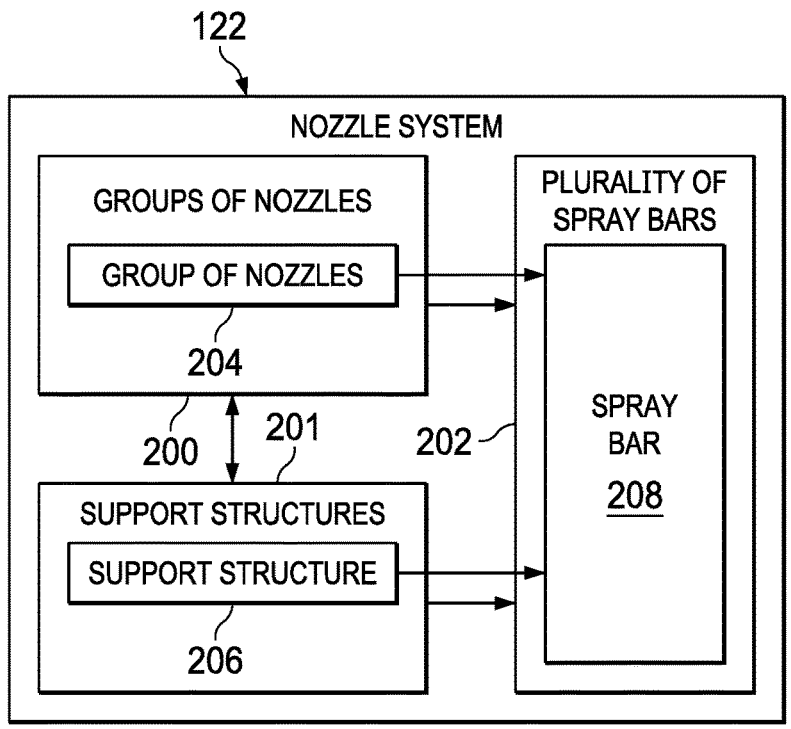
FIG. 2 is an illustration of a block diagram of a nozzle system in accordance with an illustrative embodiment.

With reference now to FIG. 2, an illustration of a block diagram of a nozzle system is depicted in accordance with an illustrative embodiment. Examples of components for nozzle system 122 are illustrated in this figure.

As depicted, nozzle system 122 is comprised of groups of nozzles 200 and support structures 201. In these illustrative examples, a group of nozzles within groups of nozzles 200 includes one or more nozzles. Further, one group of nozzles within groups of nozzles 200 may have a different number of nozzles than another group of nozzles within groups of nozzles 200.

Support structures 201 are configured to be associated with groups of nozzles 200. When one component is "associated" with another component, the association is a physical association in these depicted examples. For example, a first component, group of nozzles 204 in groups of nozzles 200, might be considered to be associated with a second component, support structure 206 in support structures 201, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component. Further, the association may be a temporary association in which the first component may be removed from the second component or vice versa.

Support structures 201 may also be configured to receive water and direct water to groups of nozzles 200. In these illustrative examples, support structures 201 may include lines, valves, or other components that may be used to control the flow of water within support structures 201. In some illustrative examples, support structures 201 also may include sensors used to generate data about water flowing through support structures 201.

As depicted, the association of groups of nozzles 200 with support structures 201 forms plurality of spray bars 202. Each group of nozzles in groups of nozzles 200 is associated with a support structure in support structures 201. For example, the association of group of nozzles 204 with support structure 206 forms spray bar 208.

Figure 3:
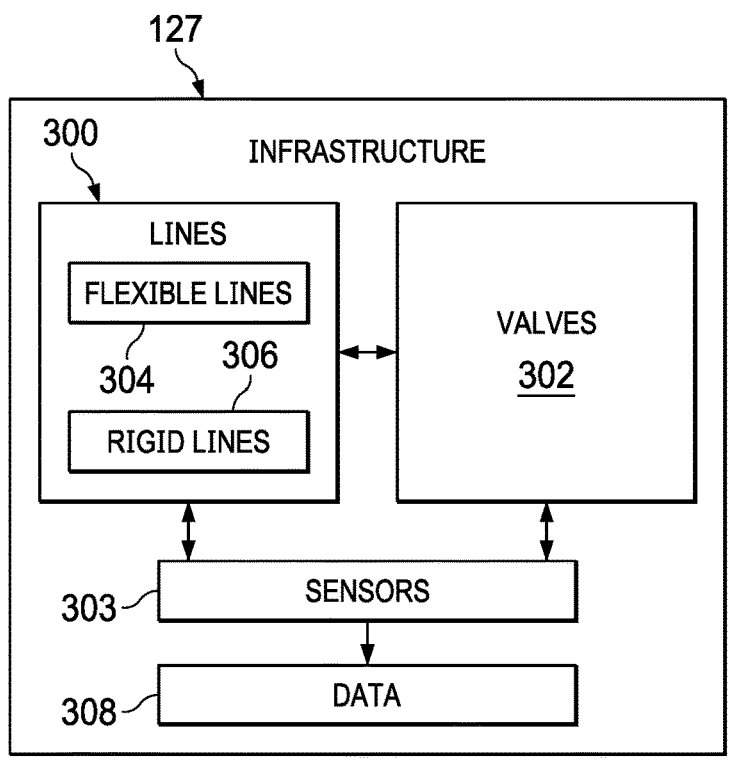
FIG. 3 is an illustration of a block diagram of an infrastructure in an icing simulation system in accordance with an illustrative embodiment.

Turning now to FIG. 3, an illustration of a block diagram of an infrastructure in an icing simulation system is depicted in accordance with an illustrative embodiment. In this illustrative example, examples of some components that may be present in infrastructure 127 include lines 300, valves 302, and sensors 303 are shown. Lines 300 may include, for example, flexible lines 304 and rigid lines 306.

In these illustrative examples, lines 300 might be used to connect water source 124 and air source 126 to nozzle system 122 in FIG. 1. Some of lines 300 might be connected to cooling system 120 in FIG. 1. Further, some of lines 300 might connect liquid nitrogen source 140 to heat exchanger 150 in FIG. 1.

Valves 302 are associated with lines 300. Valves 302 can be operated to control the flow of fluids through lines 300. In these illustrative examples, these fluids might be water 130, air 134, and liquid nitrogen 142 in FIG. 1. In these illustrative examples, the operation of valves 302 is controlled by controller 128.

Sensors 303 are configured to detect the position of valves 302, the flow of liquids through lines 300, and other suitable parameters.

As depicted, sensors 303 can be associated with lines 300 and valves 302. Further, sensors 303 also can be associated with nozzle system 122 and heat exchanger 150. Sensors 303 generate data 308 that is sent to controller 128.

The illustration of icing simulation environment 100 in FIG. 1 and the components of icing simulation environment 100 in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, one or more test objects in addition to test object 103 may be placed in test area 144 during simulation of desired type of icing conditions 102 using icing simulation system 110. Also, test object 103 may take other forms other than an aircraft or objects that are for or part of an aircraft. For example, test object 103 may be selected from one of an automobile windshield, automobile, a ship, an engine hood, a deck of a ship, and other suitable test objects.

In still other illustrative examples, valves 302, sensors 303, or both may be considered part of controller 128.

Figure 4:
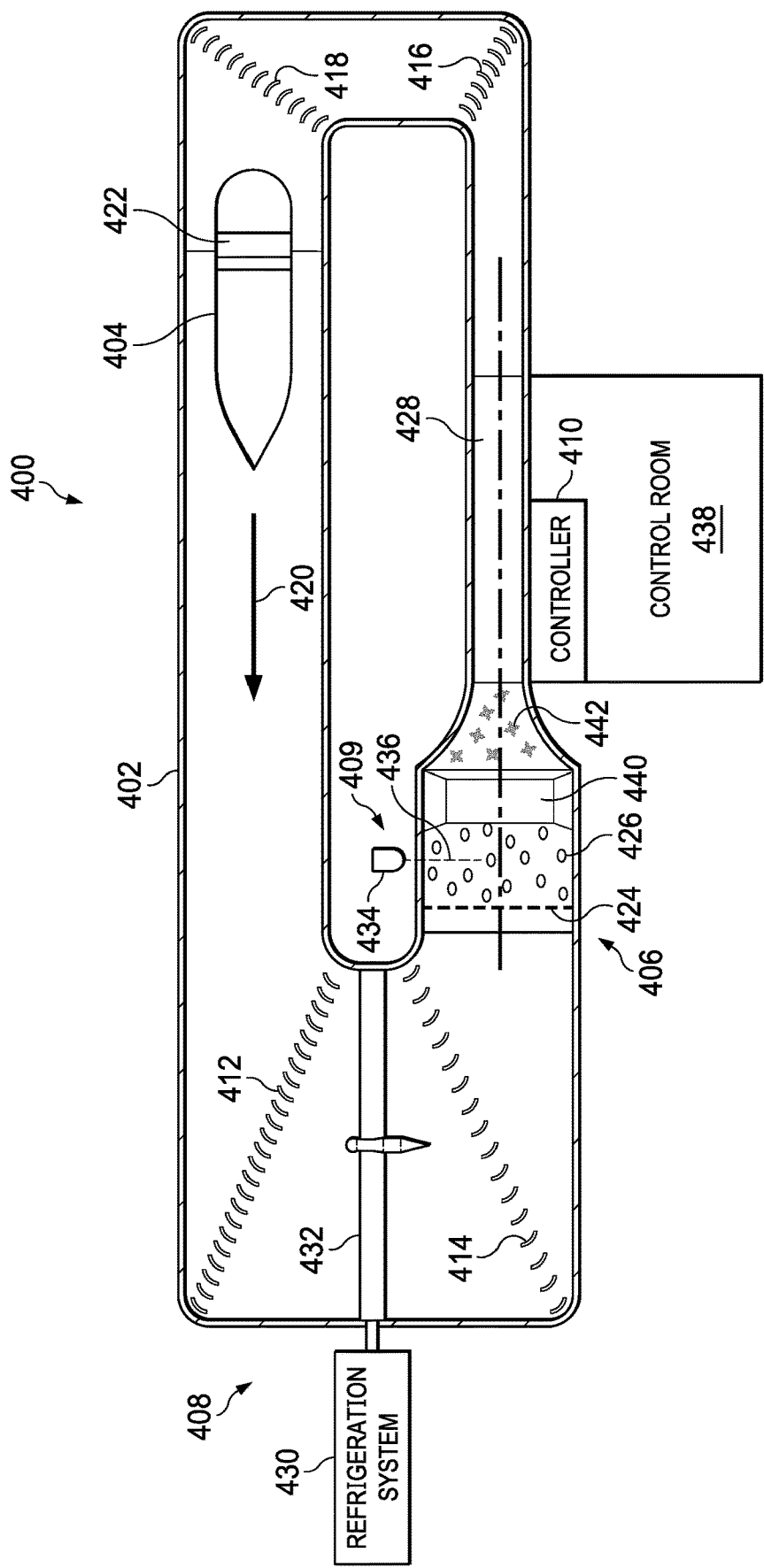
FIG. 4 is an illustration of wind tunnel incorporating an icing simulation system in accordance with an illustrative embodiment.

Turning now to FIG. 4, an illustration of a wind tunnel incorporating an icing simulation system is depicted in accordance with an illustrative embodiment. In this depicted example, icing simulation system 400 is one example of a physical implementation for icing simulation system 110 shown in block form in FIG. 1.

In this illustrative example, a top view of icing simulation system 400 is shown. As depicted, icing simulation system 400 includes wind tunnel 402, air drive system 404, nozzle system 406, cooling system 408, and controller 410.

In this depicted example, wind tunnel 402 has turning vane 412, turning vane 414, turning vane 416, and turning vane 418. These turning vanes aid in directing air flow 420 generated by air drive system 404 to turn or curve within wind tunnel 402.

As depicted, air flow 420 is generated by air drive system 404. In this illustrative example, air drive system 404 comprises fan system 422. In this illustrative example, nozzle system 406 comprises spray bars 424.

In these illustrative examples, spray bars 424 are configured to spray drops of water 426 within wind tunnel 402. Drops of water 426 are carried by air flow 420 through test section 428 within wind tunnel 402.

In these illustrative examples, air flow 420 is cooled using cooling system 408. As depicted, cooling system 408 comprises refrigeration system 430 and heat exchanger 432. Refrigeration system 430 and heat exchanger 432 operate to cool air within air flow 420 passing by or through heat exchanger 432.

In this illustrative example, sensor system 409 takes the form of laser sensor system 434. Laser sensor system 434 sends laser beam 436 into wind tunnel 402 where drops of water 426 are generated by spray bars 424 in nozzle system 406. Laser sensor system 434 sends data about the water drops 426 to controller 410 in control room 438.

With feedback from laser sensor system 434 in sensor system 409, controller 410 can adjust properties of water sent through spray bars 424 in nozzle system 406 to obtain desired sizes for drops of water 426 to simulate a desired type of icing condition.

In the illustrative example, the water drops 426 pass through a heat exchanger chamber 440 downwind of the nozzle system 406 that releases a mist of liquid nitrogen, which turns the water drops 426 into ice crystals 442 that travel down the remainder of test section 428.

The controller 410 can coordinate the activation of the nozzle system 406 and heat exchanger 440, wherein when the water spray is turned on by activating both air and water flow through the spray bars 424, a valve is simultaneously opened to introduce liquid nitrogen into the heat exchanger chamber 440.

Figure 5:
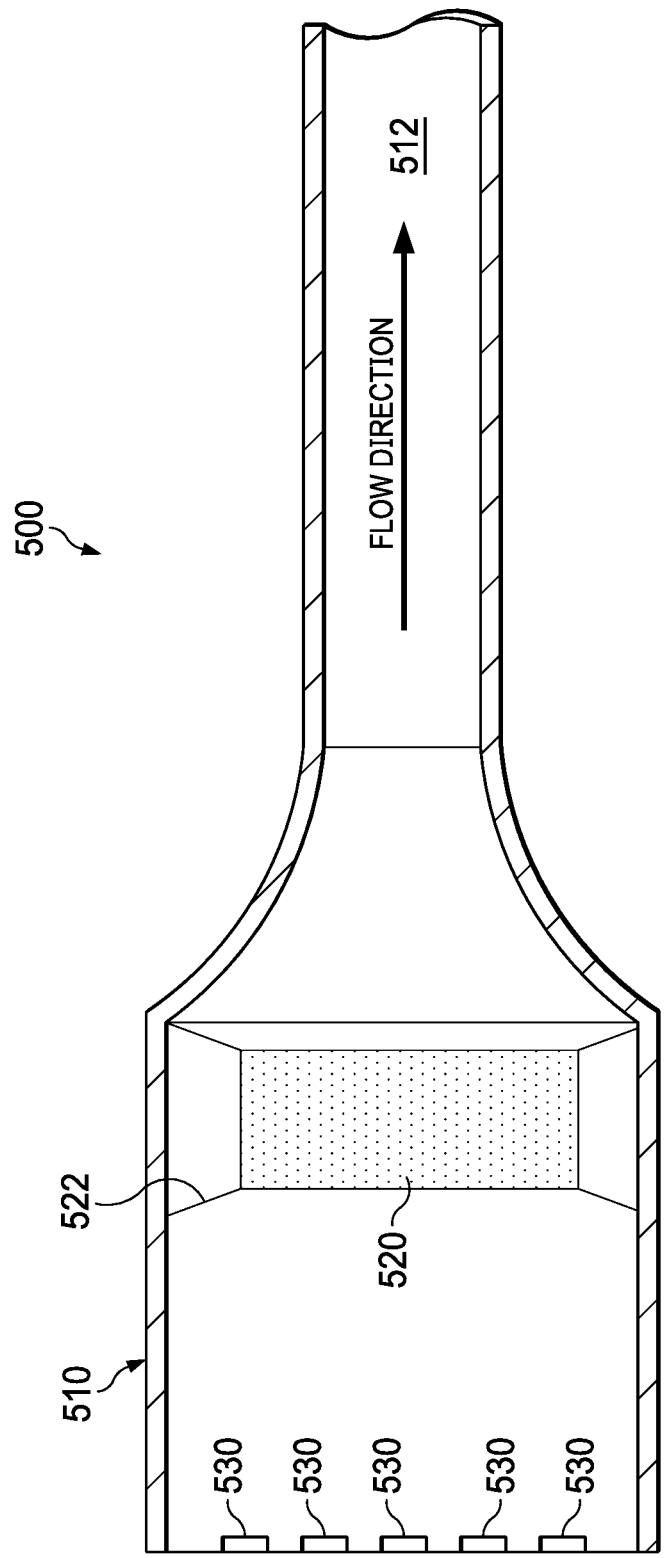
FIG. 5 depicts a side cross-section view of an ice crystal apparatus in accordance with illustrative embodiments.
Figure 6:
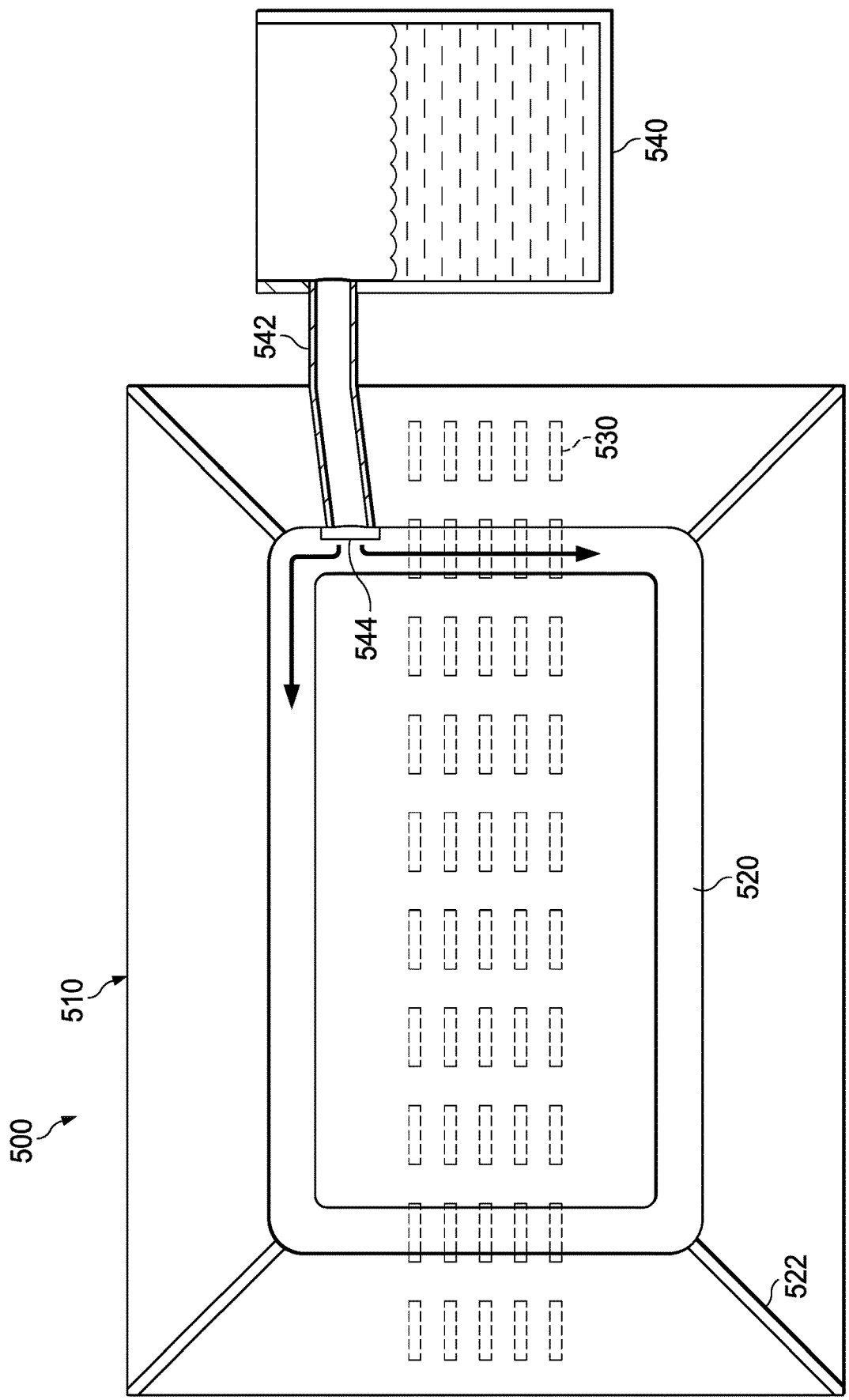
FIG. 6 depicts a front view of an ice crystal apparatus in accordance with illustrative embodiments.

FIG. 5 depicts a side cross-section view of an ice crystal apparatus 500 in accordance with illustrative embodiments. FIG. 6 depicts a front view of the ice crystal apparatus 500 in accordance with illustrative embodiments. The ice crystal apparatus 500 is located in a wind tunnel 510 upstream from the test section 512.

Heat exchanger chamber 520 is secured to the walls of the wind tunnel 510 by structural support members 522 and is positioned just downstream of the nozzles 530. In an embodiment, the heat exchanger chamber 520 is large enough in diameter to encircle at least the center of the flow circuit of the tunnel 510, so that a majority of water drops exiting the nozzles 530 will pass through the heat exchanger chamber 520.

Water drops sprayed from the nozzles 530 pass through the heat exchanger chamber 520 where they contact liquid nitrogen mist, which converts them to ice crystals that flow into the test section 512 to simulate icing conditions.

As shown in FIG. 6, liquid nitrogen is stored in a tank 540 adjacent the wind tunnel 510. Liquid nitrogen is transferred from the tank 540 to the heat exchanger chamber 520 via plumbing or tubing 542 that penetrates the tunnel wall and enters the heat exchanger chamber 520. Liquid nitrogen is maintained at a very cold temperature to stay in the liquid state. The boiling point (flash point) temperature of liquid nitrogen is approximately −320° F./−196° C. To facilitate this, the tubing 542 from the tank 540 to the heat exchanger chamber 520 can be insulated with double-wall, or shielded, insulation that can be vacuum-evacuated wherein there is an air layer between inner and outer layers of tubing insulation. In this manner, there is virtually no temperature drop over the length of the tubing 542.

Once inside the chamber 520, the plumbing can run around the chamber circumferentially, having small holes to allow for choked flow (commonly referred to as a piccolo tube). In an embodiment, nozzles can be used in conjunction with an electrically powered fan 544 to direct the flow of the liquid nitrogen in both directions around the circumference of the chamber. The liquid nitrogen can be exhausted through the very tiny holes in the chamber wall or bars and thereby flash to vapor upon entering the icing tunnel itself (see FIGS. 8 and 9). Because liquid nitrogen has a flash point of −320° F./−196° C., liquid water drops it encounters passing through the internal chamber would instantly freeze into ice crystals upon contact with the liquid nitrogen. In an alternate embodiment liquid oxygen can be used as the active substance in the heat exchanger chamber. Liquid oxygen has a flash point of −297° F./−183° C. and behaves in a similar manner to liquid nitrogen in terms of turning passing water drops to ice crystals. In addition to liquid nitrogen and liquid oxygen, liquid helium or any other suitable cryogenic liquid/agent can be used with the illustrative embodiments to convert the supercooled water drops to ice crystals.

Figure 7:
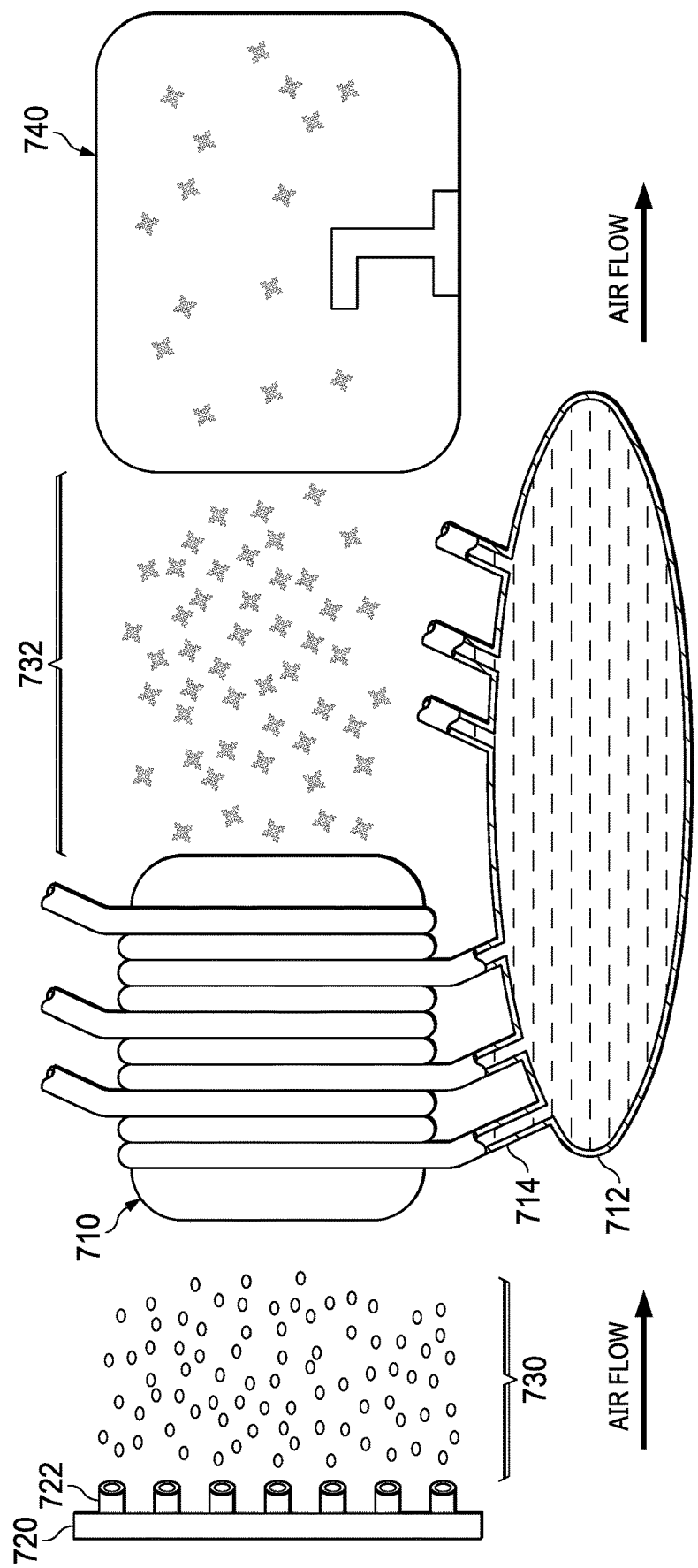
FIG. 7 depicts the operation of a heat exchanger for an ice crystal apparatus in accordance with illustrative embodiments.

FIG. 7 depicts the operation of a heat exchanger for an ice crystal apparatus in accordance with illustrative embodiments. The heat exchanger 710 is positioned immediately downstream of the water spray bars 720. Liquid nitrogen is stored in a tank 712 outside the wind tunnel and is fed into and carried through the heat exchanger 710 via tubing 714. The heat exchanger chamber 710 comprises a large round or rounded rectangular chamber, which may include an open plenum or concentric rings of tubing 714. In an embodiment, the tubing 714 is made of a material that has an exterior surface which is either inherently hydrophobic and icephobic or is coated with a similar material so the water drops 730 and ice crystals 732 will pass unimpeded through the chamber and not stick to the sides in a way that could reduce the effectiveness of the chamber itself. For example, a material made of polytetrafluoroethylene (PTFE) such as Teflon® can be used.

The spray bars 720 in this illustrative example each contain multiple spray nozzles 722, which are used selectively to optimize the icing cloud uniformity in the test section downstream of the nozzles 722. Each spray bar 720 is controlled in terms of air pressure and water pressure to produce the desired water drop size exiting the nozzles, defined as median volumetric diameter (MVD) and liquid water content (LWC).

Typically, when producing normal icing drop sizes (typically up to 50 microns), the air pressure and water pressure are approximately the same for each spray bar 720, and are adjusted within a range of 10 to 60 pound-force per square inch (psi) for the air and 20 to 240 psi for the water. In order to produce larger drops which are required for ice crystals, however, it is necessary to reduce the air pressure by an order of magnitude relative to the water pressure, e.g., a typical condition could have a water pressure of 80 psi but an air pressure of only 8 psi. This difference in pressures can produce droplets with median volumetric diameters an order of magnitude larger than standard conditions.

For example, in an icing wind tunnel in accordance with illustrative embodiments, large droplets can be produced with an MVD of approximately 500 microns. Additionally, when producing large drops in this manner, the pressure differential also produces drops with a distribution of sizes above and below the MVD, typically ranging from under 100 microns to over 1000 microns in the example given above. This would be adequate to produce drops within the size range required for ice crystals, as ice crystals typically have a median diameter of 200 to 300 microns.

After exiting the nozzles 722, supercooled water drops 730 pass through the heat exchanger 710, where exposure to the liquid nitrogen or other cryogenic agent converts then to ice crystals 732 without changing any other properties such as size or shape. The ice crystals flow downstream to the testing section 740 of the wind tunnel. As the liquid nitrogen is dispensed and absorbs heat to freeze the supercooled liquid water droplets 730, it is vaporized instantly and therefore has a negligible effect on the tunnel control temperature, which is still being controlled by its own refrigeration system to maintain the required tunnel temperature at the test section 740. Temperature sensors used by the tunnel refrigeration system are typically installed upstream of the water spray bars 720 and nozzles 722 and therefore are far downstream from the liquid nitrogen heat exchanger chamber 710 in the tunnel circuit, and any thermal effects of the liquid nitrogen injection would be accounted for during calibration of the tunnel refrigeration system. Alternatively, there can be additional temperature sensors downstream in the test section, so the temperature effects of the liquid nitrogen in the surrounding air can be accounted for in the overall temperature balance of the tunnel circuit.

In the example embodiment shown in FIG. 7, the walls lining the chamber of the heat exchanger 710 are solid. Alternatively, they can be perforated with very tiny holes, such as might be used in an aircraft engine acoustic liner panel.

Figure 8:
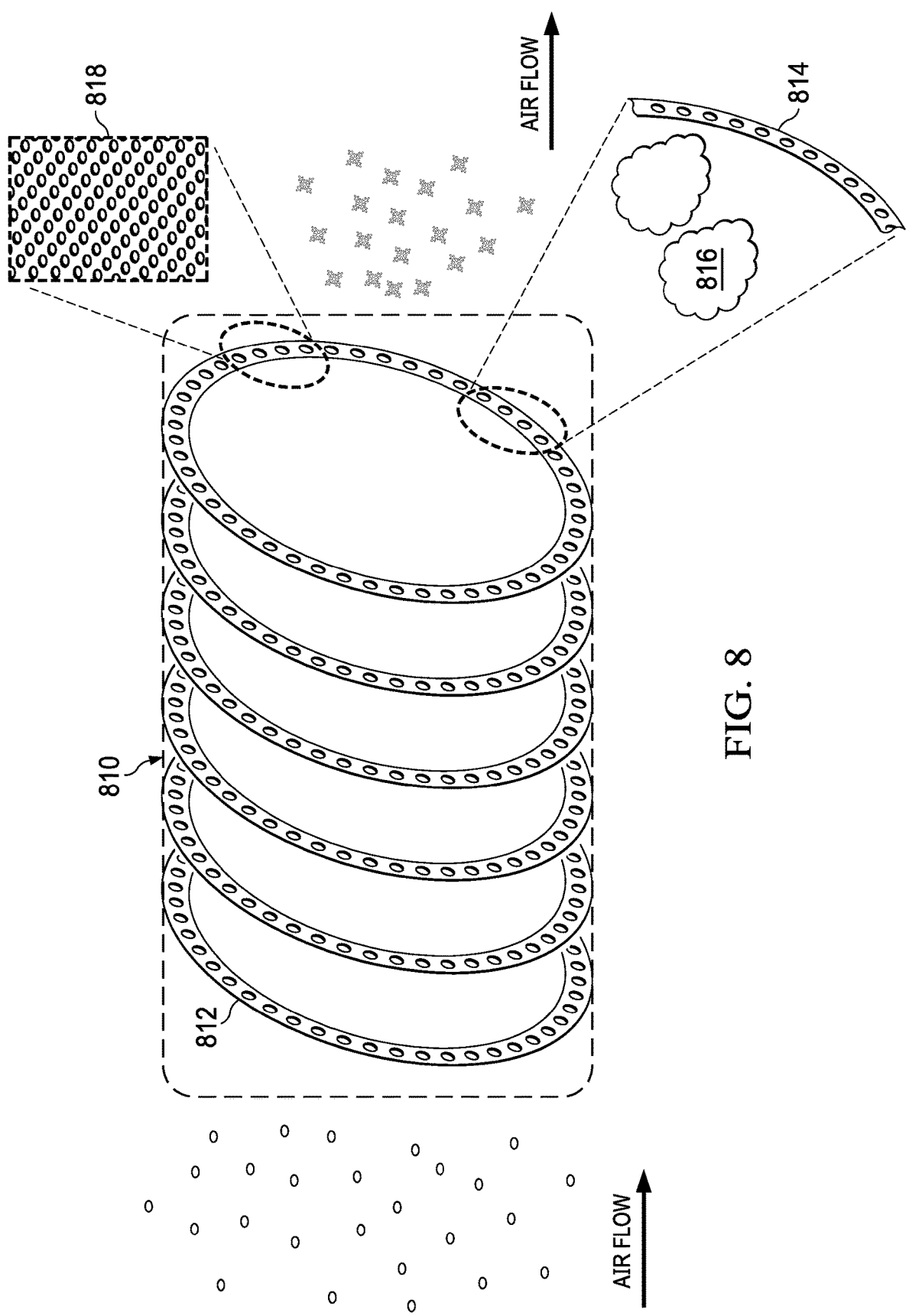
FIG. 8 depicts a heat exchanger chamber comprising perforated spray tubes in which illustrative embodiments can be implemented.

FIG. 8 depicts a heat exchanger chamber comprising perforated spray tubes in which illustrative embodiments can be implemented. In this embodiment, the liquid nitrogen circulates through perforated tubing 812 inside the heat exchanger chamber 810. As shown by callout 814, the liquid nitrogen escapes through the perforations in the tubing 812 as a mist 816.

Callout 818 shows the perforation of the spray tubing 812 in more detail. The diameter of the perforation holes can be 0.05-0.2 mm, and the density of holes can be such that the total open area from the holes is greater than 5% of an area including both the holes and the perforated walls of the tubing 812. This size and density produces a very fine mist of liquid nitrogen 816 that will instantly cool the drops to below at least −40° F./C, which is the point at which supercooled drops do not exist in nature but instead will be completely ice crystals.

The misting action of the liquid nitrogen contacting the water drops also serves to agitate the drops so they are forced to change state from liquid to solid. The liquid nitrogen (or liquid oxygen) circulates around the inside of the chamber 810 and is replenished for as long as necessary to keep the chamber cold enough to turn liquid drops into ice crystals for the duration of the test.

Figure 9:
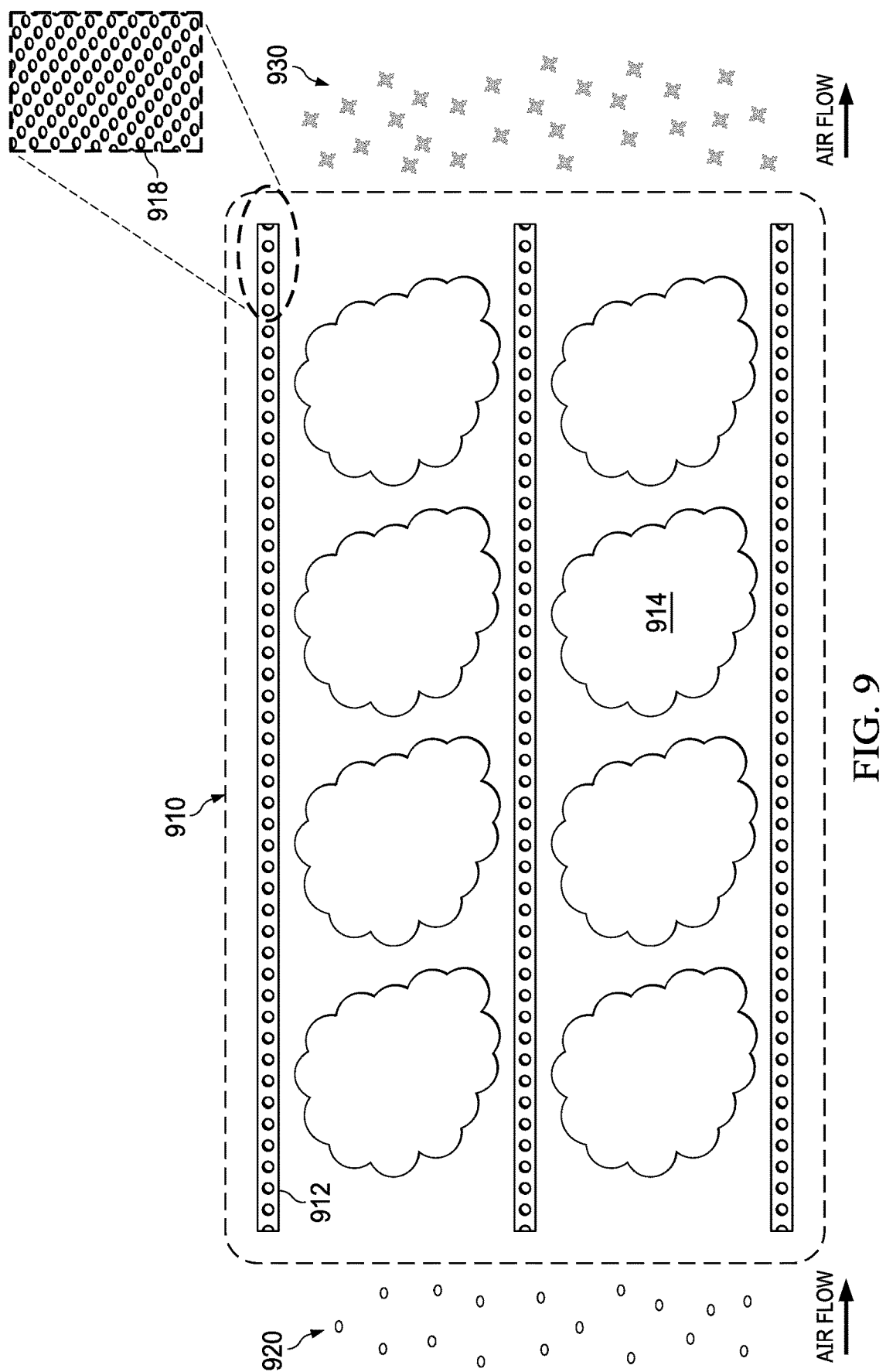
FIG. 9 depicts a heat exchanger chamber comprising perforated spray bars in which illustrative embodiments can be implemented.

FIG. 9 depicts a heat exchanger chamber comprising perforated spray bars in which illustrative embodiments can be implemented. In this illustrative embodiment the heat exchanger chamber 910 comprises several thin, airfoil-shaped horizontal bars 912 with perforated holes pointing upwards and downwards the liquid nitrogen (or oxygen) circulates and escape as mist 914. Callout 918 shows the perforations of the spray bars 912 in more detail. This illustrative embodiment is advantageous for a tunnel with a large cross-sectional area, to ensure the liquid nitrogen is distributed more evenly to freeze the water drops 920 into ice crystals 930 across the entire area.

Figure 10:
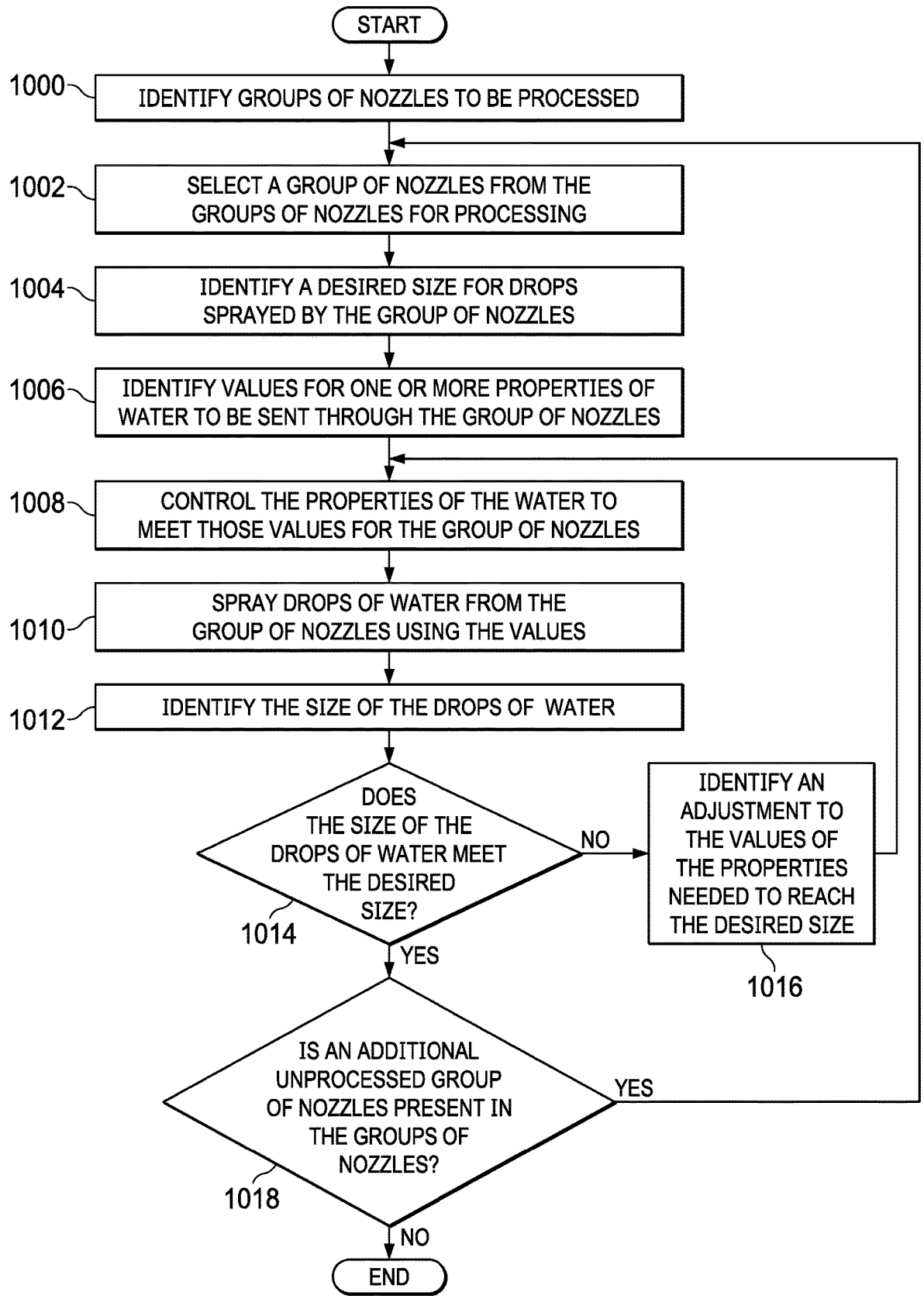
FIG. 10 is an illustration of a flowchart of a process for calibrating an icing simulation system in accordance with an illustrative embodiment.

With reference now to FIG. 10, an illustration of a flowchart of a process for calibrating an icing simulation system is depicted in accordance with an illustrative embodiment. This process may be used to set icing simulation system 110 to produce drops 132 of water 130 with desired sizes for desired type of icing condition 102 in FIG. 1.

The process begins by identifying groups of nozzles to be processed (operation 1000). The process then selects a group of nozzles from the groups of nozzles for processing (operation 1002).

The process identifies a desired size for drops sprayed by the group of nozzles (operation 1004). Next, the process identifies values for one or more properties of water, for example, temperature, to be sent through the group of nozzles (operation 1006). The properties of the water are controlled to meet those values for the group of nozzles (operation 1008). Drops of water are then sprayed from the group of nozzles using the values (operation 1010).

Next, the size of the drops of water is identified (operation 1012). The size of the drops of water may be identified using a sensor system, such as sensor system 434 in FIG. 4. A determination is made as to whether the size of the drops of water meet the desired size (operation 1014). The desired size may be met if the size of the drops of water identified are the same as the desired size. In these illustrative examples, the desired size also may be met, in some cases, if the size of the drops of water are within a range of the desired size.

If the size of the drops of water does not meet the desired size, an adjustment to the values of the properties needed to reach the desired size is identified (operation 1016). The process then returns to operation 1008.

With reference again to operation 1014, if the desired size of the drops of water is met, a determination is made as to whether an additional unprocessed group of nozzles is present in the groups of nozzles (operation 1018). If an additional unprocessed group of nozzles is present, the process returns to operation 1002. Otherwise, the process terminates.

Although this process may be used to calibrate the groups of nozzles prior to simulating a desired type of icing condition, this process may also be used at other times. For example, this process also may be used while the desired type of icing condition is being simulated. The process may be used to adjust the manner in which drops of water are sprayed such that the desired type of icing condition can be maintained even though other parameters in the icing simulation environment may change.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
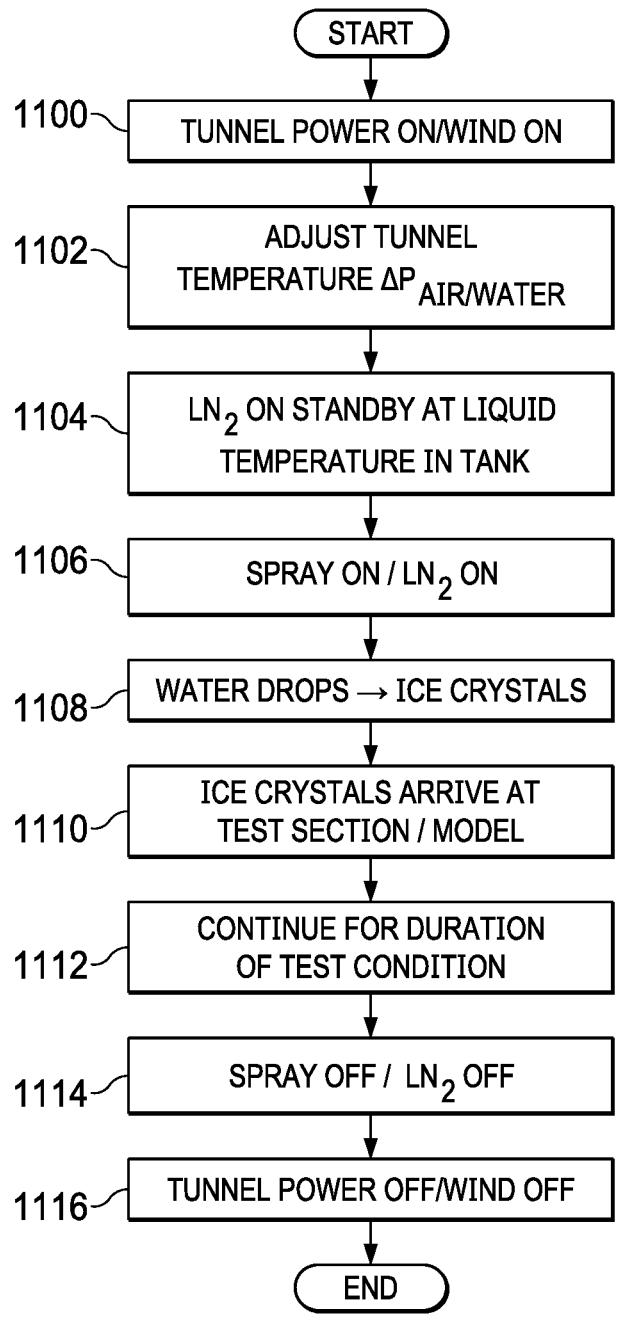
FIG. 11 is an illustration of a flowchart of the operation of an ice crystal apparatus in a wind tunnel is depicted in accordance with an illustrative embodiment.

FIG. 11 is an illustration of a flowchart of the operation of an ice crystal apparatus in a wind tunnel is depicted in accordance with an illustrative embodiment. The process begins by activating power to the tunnel and turning on the wind (step 1100). Next the temperature in the tunnel is calibrated and set, along with the air and water pressure for producing the water drops (step 1102). The liquid nitrogen (or oxygen) is put on standby 1104).

The controller then simultaneously turns on the spray nozzle system and liquid nitrogen flow through the heat exchanger (step 1106). Water drops from the nozzles pass through the heat exchanger chamber and are converted into ice crystals as they come in contact with the liquid nitrogen (step 1108). The ice crystals then proceed downstream to the test section containing the test model (step 1110).

The water spray nozzle system and heat exchanger are kept on for the designated duration of the test (step 1112) after which they are turned off by the controller (step 1114). The tunnel and wind power are then turned off (step 1116).

Figure 12:
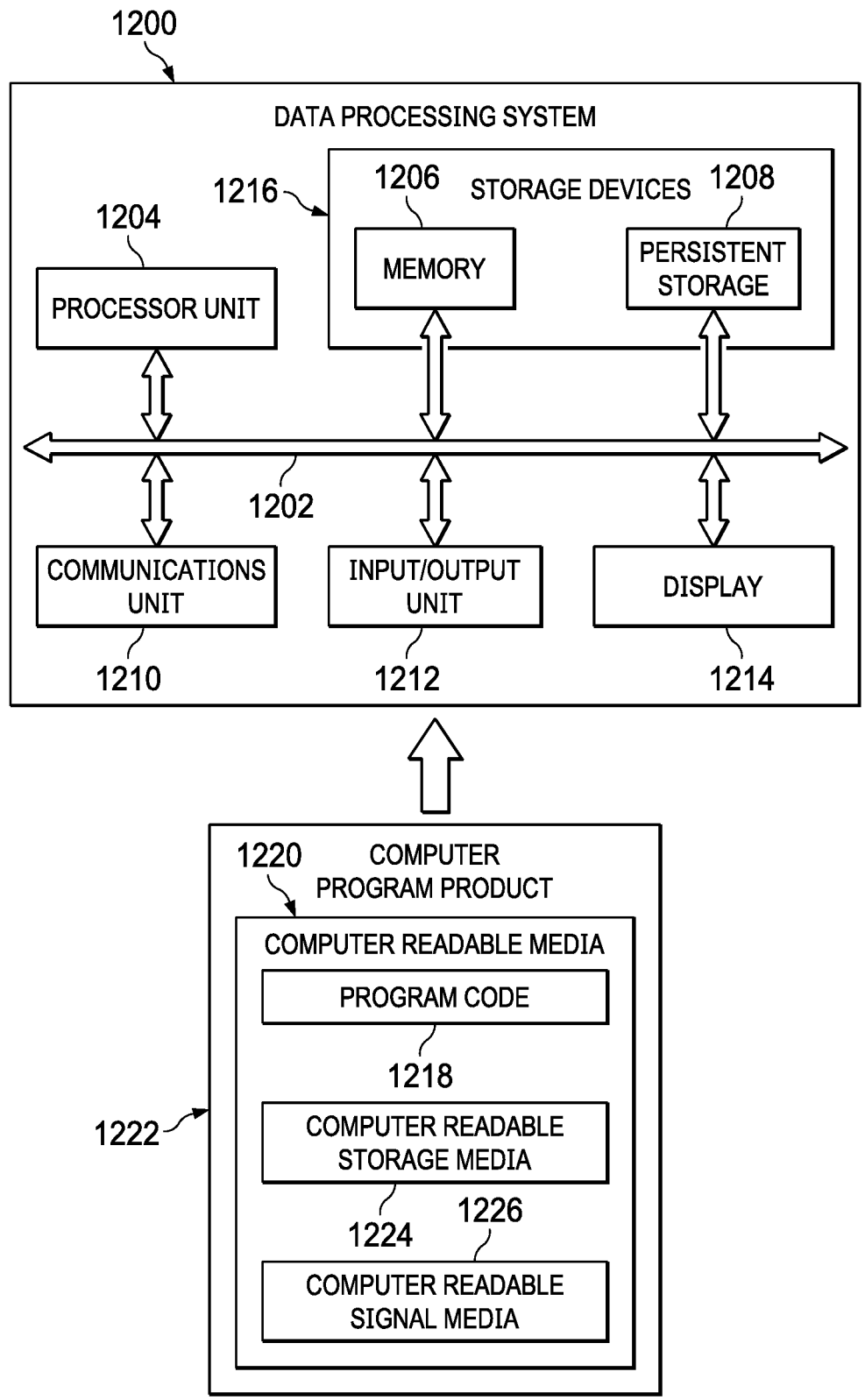
FIG. 12 is an illustration of a data processing system in accordance with an illustrative embodiment.

Turning now to FIG. 12, an illustration of a data processing system is depicted in accordance with an illustrative embodiment. Data processing system 1200 may be used to implement controller 128 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code 1218.

Figure 13:
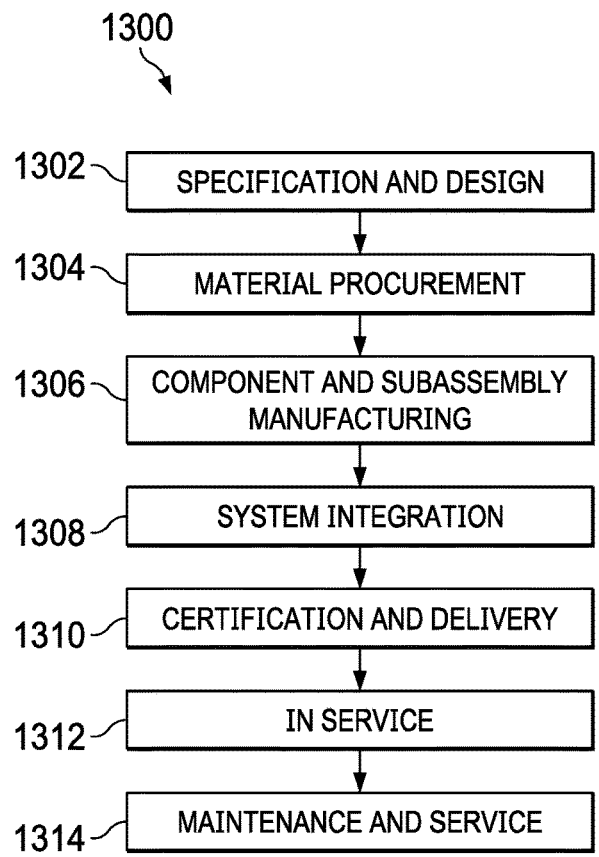
FIG. 13 is an illustration of an aircraft manufacturing and service method in accordance with an illustrative embodiment.
Figure 14:
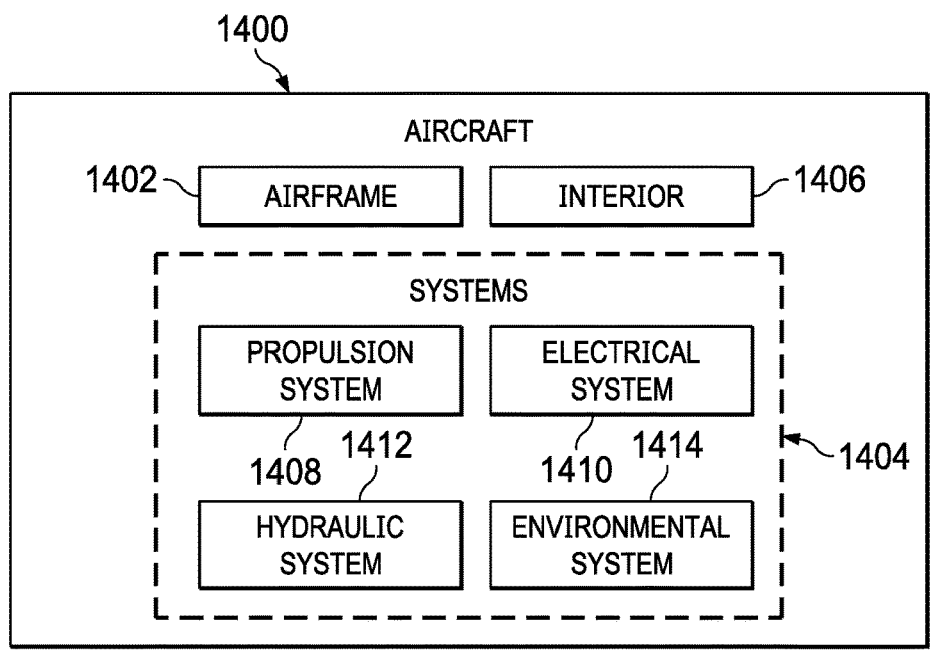
FIG. 14 is an illustration of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13.

As yet another example, one or more apparatus embodiments, method embodiments, or a combination thereof may be utilized during production stages, such as specification and design 1302 and system integration 1308 in FIG. 13. For example, icing simulation system 110 may be used to test various prototypes of components or structures during specification and design 1302.

One or more apparatus embodiments, method embodiments, or a combination thereof may be utilized while aircraft 1400 is in service 1312 and/or during maintenance and service 1314. For example, icing simulation system 110 may be used to test upgrades or changes to aircraft 1400 made during maintenance and service 1314. For example, if new or different sensor systems for detecting icing conditions are added to aircraft 1400, icing simulation system 110 may be used to determine whether those sensors perform as desired. The use of a number of the different illustrative embodiments may substantially expedite the assembly of and/or reduce the cost of aircraft 1400.

Thus, one or more illustrative embodiments provide a method and apparatus for simulating icing conditions. The simulation of the icing conditions may be used to determine whether a test object performs as desired during different types of icing conditions. For example, as requirements change on what types of icing conditions are required to be detected by an aircraft, sensor systems for those types of icing conditions may be designed and tested using an illustrative embodiment.

For example, icing simulation system 110 provides an ability to generate water drops having different sizes. In particular, the water drops may have two ranges of sizes. These ranges may be ranges that represent supercooled large drop icing conditions. The ranges may be generated by controlling different spray bars within icing simulation system 110 to spray drops of water with different sizes. In this manner, the spray bars may generate drops of water having the two desired ranges of drop sizes for supercooled large drop icing conditions.

With icing simulation system 110, recreating a desired icing condition may reduce the amount of time needed to meet regulations regarding the icing conditions. Further, with the use of icing simulation system 110, the time, effort, and/or expense needed to certify an aircraft or icing detection system may be reduced.

Of course, icing simulation system 110 may be used to generate icing conditions other than those described in the illustrative examples. For example, other icing conditions may include three or more ranges of drop sizes.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

The description of the different illustrative embodiments has been presented for purposes of illustration and description, and is not intended to be exhaustive or limited to the embodiments in the form disclosed. Many modifications and variations will be apparent to those of ordinary skill in the art.

Although an illustrative embodiment has been described with respect to aircraft, the illustrative embodiment may be applied to other types of platforms and structures for those platforms. For example, without limitation, other illustrative embodiments may be applied to a mobile platform, a stationary platform, a land-based structure, an aquatic-based structure, a space-based structure, and/or some other suitable platform or structure for those platforms. More specifically, the different illustrative embodiments may be applied to, for example, without limitation, a submarine, a bus, a personnel carrier, a tank, a train, an automobile, a spacecraft, a space station, a satellite, a surface ship, and/or some other suitable platform.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of simulating icing conditions using a wind tunnel, the method comprising:
   spraying water drops from a number of nozzles into the wind tunnel; and
   spraying a mist of cryogenic liquid into a path of the water drops downwind of the nozzles in the wind tunnel, wherein the mist of cryogenic liquid turns the water drops into ice crystals.

2. The method of claim 1, wherein the water drops are supercooled when sprayed from the nozzles.

3. The method of claim 1, wherein the cryogenic liquid is released within a heat exchanger chamber through which the water drops pass in the wind tunnel.

4. The method of claim 3, wherein the heat exchanger chamber further comprises a number of continuous rings of tubing with perforated holes from which the mist of cryogenic liquid is sprayed.

5. The method of claim 4, wherein the continuous rings of tubing further comprise a hydrophobic and icephobic exterior surface.

6. The method of claim 3, wherein the heat exchanger chamber further comprises a number of horizontal bars with perforated holes from which the mist of cryogenic liquid is sprayed.

7. The method of claim 6, wherein the horizontal bars further comprise a hydrophobic and icephobic exterior surface.

8. The method of claim 3, wherein the heat exchanger chamber comprises solid walls lining the heat exchanger chamber.

9. The method of claim 3, wherein the heat exchanger chamber comprises perforated walls lining the heat exchanger chamber.

10. The method of claim 9, wherein the perforated walls comprise holes with a diameter of 0.05-0.2 millimeters (mm) and the holes comprise a total open area greater than 5% of an area including the holes and the perforated walls.

11. The method of claim 1, wherein the cryogenic liquid comprises at least one of:
   liquid nitrogen;
   liquid oxygen; or
   liquid helium.

12. An icing simulation system comprising:
   a wind tunnel;
   a number of nozzles configured to spray water drops into the wind tunnel; and
   a heat exchanger chamber downwind from the nozzles, wherein the heat exchanger chamber is configured to spray a mist of cryogenic liquid into a path of the water drops.

13. The system of claim 12, further comprising a control system configured to simultaneously turn on a nozzle of the nozzles and introduce the cryogenic liquid into the heat exchanger chamber.

14. The system of claim 12, further comprising a cooling system in fluid communication upstream of the nozzles and configured to supercool water before the supercooled water is sprayed by the nozzles.

15. The system of claim 12, wherein the heat exchanger chamber further comprises a number of continuous rings of tubing with perforated holes from which the mist of cryogenic liquid is sprayed.

16. The system of claim 15, wherein the continuous rings of tubing further comprise a hydrophobic and icephobic exterior surface.

17. The system of claim 12, wherein the heat exchanger chamber further comprises a number of horizontal bars with perforated holes from which the mist of cryogenic liquid is sprayed.

18. The system of claim 17, wherein the horizontal bars further comprise a hydrophobic and icephobic exterior surface.

19. The system of claim 12, wherein the heat exchanger chamber comprises solid walls lining the heat exchanger chamber.

20. The system of claim 12, wherein the heat exchanger chamber comprises perforated walls lining the heat exchanger chamber.

* * * * *